April 8, 1941.  W. T. MUNFORD  2,237,497
AIR CONDITIONER FOR AUTOMOBILES
Filed Sept. 14, 1939  2 Sheets-Sheet 1
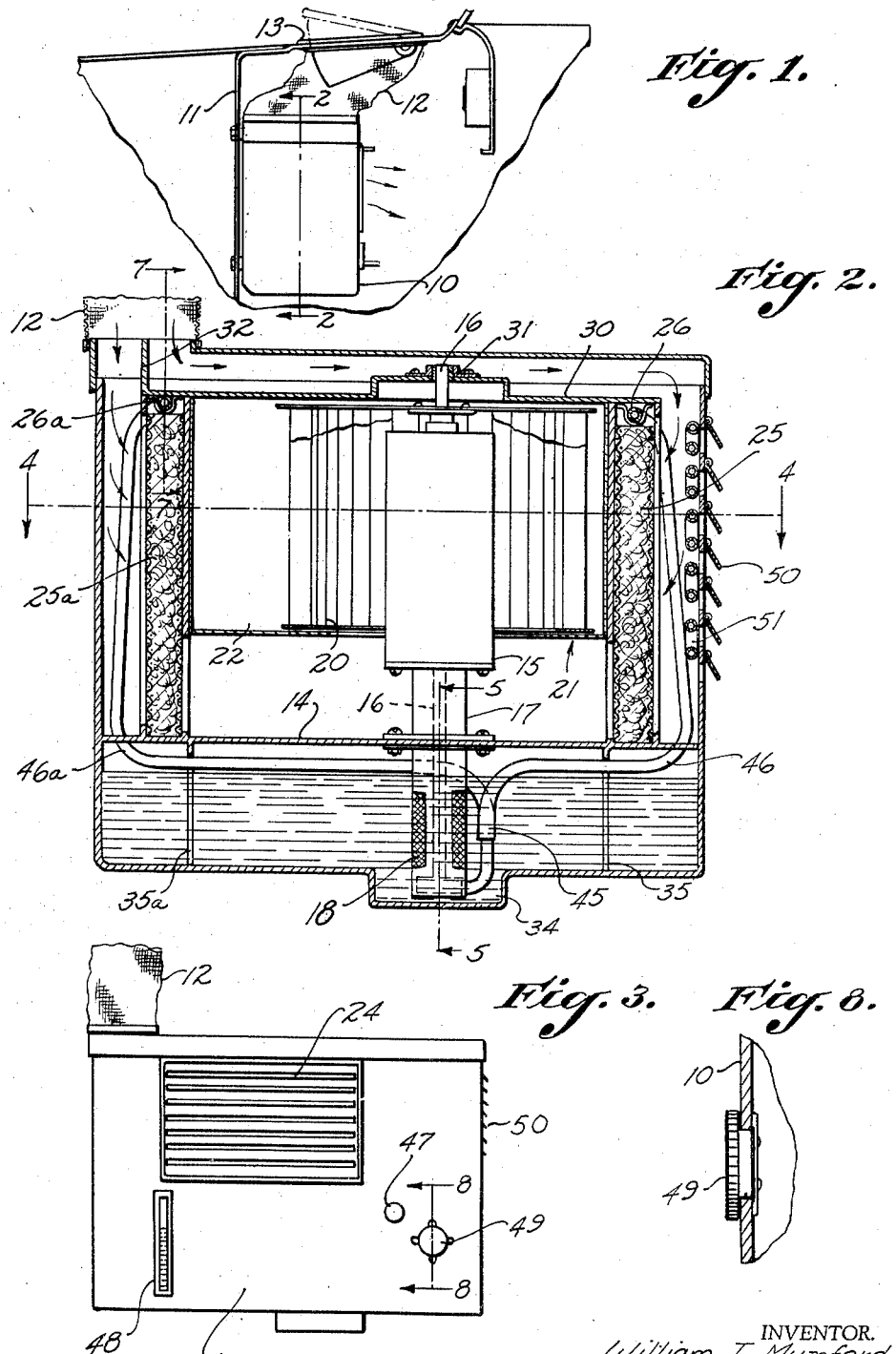
INVENTOR.
William T. Munford,
BY Robert W. Fulwider
ATTORNEY.

April 8, 1941.  W. T. MUNFORD  2,237,497

AIR CONDITIONER FOR AUTOMOBILES

Filed Sept. 14, 1939  2 Sheets-Sheet 2

INVENTOR.
William T. Munford,
BY Robert W. Fulwider
ATTORNEY.

Patented Apr. 8, 1941

2,237,497

UNITED STATES PATENT OFFICE 2,237,497

AIR CONDITIONER FOR AUTOMOBILES

William Taylor Munford, Ontario, Calif.

Application September 14, 1939, Serial No. 294,815

5 Claims. (Cl. 261—29)

My invention relates generally to air conditioning apparatus making use of evaporative pads and designed to be installed in automobiles.

In my copending application, Serial No. 290,028, filed August 14, 1939, I disclose a similar type of air conditioner, and the present application relates to an air conditioner having different operative means together with certain improved methods of effecting the desired cooling.

It is a major object of my invention to provide an evaporative cooler, suitable for installation in automobiles and having a high cooling efficiency.

It is a further object of my invention to provide such a device which is small in size, comparatively light in weight, and requires but a small amount of current to operate it.

It is also an object of my invention to provide a cooler which is completely self-contained, and which carries a sufficient amount of water to operate it for a considerable length of time.

It is a still further object of my invention to provide such a cooler which, with a few minor adjustments, will deliver warm air to the interior of the automobile in colder weather.

Figure 4:
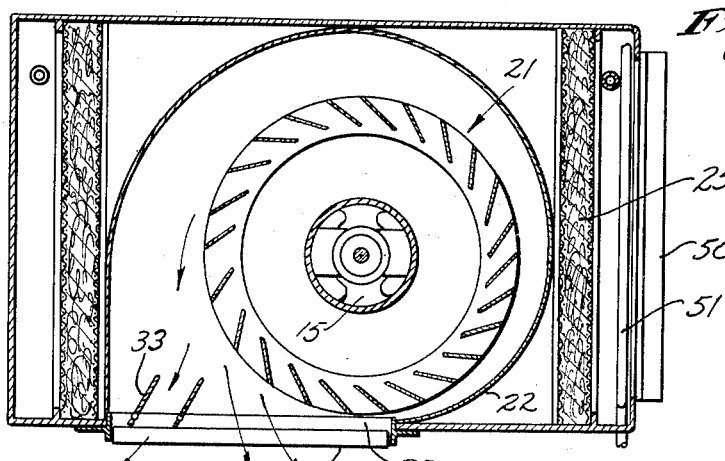
Figure 5:
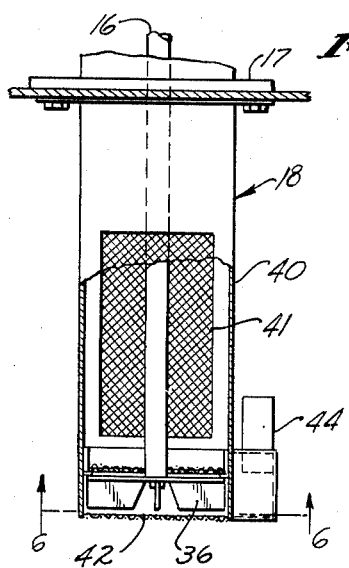
Figure 7:
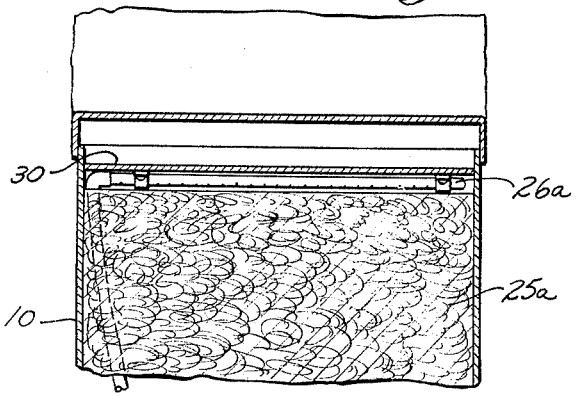
Figure 6:
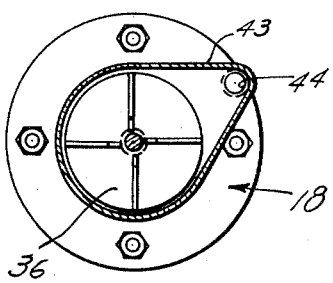

These and other objects of my invention will become apparent from the following description of a preferred form thereof, and from the drawings illustrating that form, in which:

Fig. 1 is a broken-away cross-sectional view of the cowl and a portion of the radiator hood of an automobile showing the method of installing the cooler therein, Fig. 2 is a cross-sectional view of the cooler, taken at 2—2 in Fig. 1, Fig. 3 is a front elevational view of the cooler as it appears to those in the driver's compartment of the car, Fig. 4 is a cross-sectional view in plan, taken at 4—4 in Fig. 2, Fig. 5 is an axial cross-sectional view of the pump taken at 5—5 in Fig. 2, Fig. 6 is an end view of the pump taken at 6—6 in Fig. 5, Fig. 7 is a view taken at 7—7 in Fig. 2, and showing the method of supplying water to the evaporative pads, and Fig. 8 is a view taken at 8—8 in Fig. 3, showing the method of installing the filler cap.

Referring now to the drawings, and particularly to Figs. 1 and 2 thereof, the numeral 10 indicates a housing designed normally to be attached to the bulkhead 11 separating the engine compartment from the passenger compartment of an automobile. A duct 12 leads from one end of the top of the housing 10 to the usual ventilator found in automobiles such as the cowl ventilator 13. Normally the housing 10 will be of substantially rectangular shape for ease of construction and installation, but other shapes may be used as desired or as necessitated by special space requirements.

A horizontal partition 14 divides the space within the housing 10 into an upper chamber containing the air conveying and cooling apparatus, and a lower chamber which serves as a reservoir for the water required in the operation of the cooler. Supported by the partition 14 is a motor support 17 on which is mounted a motor 15 whose shaft 16 extends downwardly through the motor support 17 and partition 14 to a pump 18 which is driven by the motor. Attached to the upper end of the shaft 16 and adapted to be driven thereby is a rotor 20 of a blower 21 disposed so as to surround the motor 15 and aid in cooling the latter by reason of air drawn up around it. The blower 21 is surrounded by a scroll or shell 22 which directs the air set in motion by the blower through an opening 23 in the front wall of the housing 10. Louvers 24 may be provided to aid in directing the cool air to any portion of the car desired.

Near the end walls of the upper compartment of the housing 10, but spaced inwardly therefrom, I provide evaporative pads 25 and 25a of any suitable material, such as excelsior, sisal hemp, or the like. The pads 25 and 25a extend from the front to the rear wall of the housing 10 and from the partition 14 up to the top of the scroll 22. Along the top of the pads 25 and 25a, I provide perforated pipes 26 and 26a, respectively, connected to the pump 18 in a manner to be hereinafter described. The partition 14 immediately below the pads 25 and 25a is provided with perforations through which water may return to the reservoir, after traveling down the pads.

Across the top of the scroll 22 and extending over the top edges of the evaporative pads 25 and 25a, I provide a horizontal partition 30, spaced from the top of the housing 10, and forming a passageway through which air may pass directly from the duct 12 to the space between the end wall of the housing and the evaporative pad 25. A bearing 31 aligned with the shaft 16 overcomes any tendency that the shaft may have to whip when running under load, and a vertically-extending member 32 attached to the partition 30 and aligned with the outer edge of the evaporative pad 25a acts to divide the air flowing in through the duct 12 into two portions.

Thus when air enters the cowl ventilator 13, it passes through the duct 12 and into one end of the upper portion of the housing 10 where it is divided by the vertical member 32 into two portions, one of which passes on down into the space between pad 25a and its end wall, and then through the evaporative pad 25a into the space which contains the blower 21, while the other portion of the air passes between the top of the housing 10 and the horizontal partition 30 into the end space between the evaporative pad 25 and its end wall, then through the pad and into the space occupied by the blower 21. In the blower compartment, the two streams of air meet, and are drawn up around the motor 15, cooling it, and are then guided by the scroll 22, and discharged as a single stream through the opening 23. I prefer to provide additional louvers 33 which are vertically positioned at one end of the opening 23, these louvers acting to deflect a certain amount of the conditioned air toward the driver, while the natural direction of flow of the air induced by the rotor 20, directs the air in a direction generally toward the other passenger in the front seat of the automobile.

The lower compartment in the housing 10 beneath the partition 14 acts as a reservoir to hold the water necessary for the operation of the cooler. A sump 34 is provided to receive the lower end of the pump 18, and permits the device to continue functioning when the water supply is nearly exhausted. Baffles 35 and 35a are preferably provided to prevent undue splashing of the water within the reservoir, and thus aid in eliminating side stresses which might be developed against the pump 18.

As illustrated in Fig. 5, the pump 18 is mounted immediately beneath the motor support 17 and an impeller 36 mounted on the lower end of the shaft 16 forces the water from the sump 34 through suitable tubing to the perforated tubes 26 and 26a. In my preferred form of pump, I provide a cylindrical shell 40 having screen apertures 41 in the side thereof to permit water to flow from the reservoir to the pump, but holding back any dirt or foreign matter which might clog the perforations in the perforated tubes 26 and 26a. A similar screen 42 over the lower open end of the cylindrical shell 40 permits water to enter from the sump 34, while at the same time preventing foreign matter from entering the pump, as previously described.

For reasons of economy of manufacture, I prefer to form the impeller 36 from a sheet metal stamping. The impeller shown in the drawings has four blades with radially-extending spaces, but it will be apparent that other forms may readily be used. The lower end of the cylinder 40 surrounds the major portion of the impeller 36 and a V-shaped protuberance 43 enclosing the remainder of the impeller, conducts the water thrown out thereby to a tube 44. I prefer to use but a single tube and then provide this tube with a Y-branch 45 so that individual tubes 46 and 46a may carry the water to the perforated pipes 26 and 26a, but it will be apparent that two entirely separate tubes may be run from the pump 18 if that is considered desirable.

A suitably enclosed rheostat to control the speed of the motor 14 may be mounted so that its knob 47 extends through the front wall of the housing 10, and if desired this rheostat may be used as a switch, though normally a switch would be mounted on the dash of the automobile to turn the air conditioner on and off. A vertically-extending window 48 enables one to see how much water remains in the reservoir and filling of the latter is accomplished through the removable cap 49 which opens into the space above the partition 14, so that the reservoir may be completely filled without water running out of the filler hole. A special opening may be made in the partition 14 to permit the water to flow directly into the reservoir, or reliance may be placed on the drain holes at the bottom of the evaporative pad 25.

It will be noted that no provision has been made for varying the flow of water at any given speed of the motor, and hence the flow of water must be such that there is a sufficient amount to take care of the most extreme condition of dry air. However, instead of merely providing this minimum flow of water, I prefer to provide an amount greater than the minimum required so that under all conditions excess water is supplied to the pads 25 and 25a and returns through the holes in the partition 14 to the reservoir. In this way, the water thus returned has been cooled to approximately the dew-point of the incoming air, and hence after the air conditioner has been in operation for a few moments, the water in the reservoir has been substantially cooled. Thus, the reduced temperature of the water aids in cooling the incoming air by conduction, while the evaporation of the water continues to play its part in reducing the temperature of the incoming air.

An important feature of my invention is the use of a plurality of evaporative pads with air dividing means designed so that a predetermined percentage of the total air may be passed through each pad. In this way, I am able to provide a cooler having a relatively large pad area within a comparatively small space; and for installation in automobiles where the space restrictions are quite severe, it will be apparent that this is of great importance. By the use of this method, a better distribution of air and water is obtained, and there are no "dry spots" present in the pad which would reduce the efficiency of the apparatus. The pads 25 and 25a are of course removable so that when they have served their period of usefulness, they may be removed and new pads inserted in their place.

As previously mentioned, one of the objects of my invention is to provide an air conditioner of the type disclosed which by minor adjustment can be transformed into a heater.

To accomplish this object, I provide one or both of the end walls of the housing 10 with adjustable horizontal louvers 50 which are normally closed when my device is functioning as a cooler so as not to interfere with the air circulation previously described. Heating coils 51 are disposed in the louver openings and are connected by piping to the water jacket of the automobile engine. Suitable valve means not shown is provided whereby hot water from the engine is circulated through the coils when the louvers 50 are open, and it is desired to use the device as a heater, and no water is circulated when it is operating as a cooler.

In cold weather the cowl 13 is closed, and the water is removed from the reservoir or the pump is disconnected. The pads may or may not be removed and the louvers 50 are opened. The valve means (not shown) is opened permitting hot water to flow through the coils; the fan is turned on so that air is drawn through the louvers 50 across the heating coils 51 and into the chamber of the housing whence it is discharged through the opening 23 in normal manner. The coils 51 may be provided with fins if desired to facilitate the heat exchange.

It will be understood of course that the device can be operated both as a cooler and a heater at the same time, the net effect normally being to merely wash and filter the air. By disposing the heating coils as shown, it is an easy matter to keep recirculating the air in the driver's compartment and to clean it in every cycle, it being possible of course to employ the pads simply as mechanical filters without washing the air. It will also be understood that louvers and heating coils may be placed on each side of the housing, although I have only shown them in the one side in back of pad 25.

Having now described a preferred form of my invention, I wish it to be understood that I do not wish to be limited to the particular form or arrangement of parts herein shown or described or particularly covered in my claims.

I claim as my invention:

1. An air conditioner for automobiles which includes: a housing having a horizontal partition therein dividing it into an upper compartment and a reservoir; an evaporative pad in each end of said upper compartment but spaced from the end walls of said housing; a second horizontal partition, disposed above said pads forming with the top of said housing a horizontal duct connecting the spaces between said pads and their respective end walls; means for connecting said duct to the ventilator of said automobile; a blower in the compartment formed by said pads and said partitions adapted to draw air through said pads and discharge it into the passenger compartment of said automobile; a pump mounted on the lower end of said blower shaft and in said reservoir; a motor adapted to drive said pump and blower; and means for conducting water from said pump to said pads.

2. An air conditioner for automobiles which includes: a housing having an upper compartment; an evaporative pad in each end of said upper compartment but spaced from the end walls of said housing; a horizontal partition disposed above said pads forming with the top of said housing a horizontal duct connecting the spaces between said pads and their respective end walls; means for connecting said duct to the ventilator of said automobile; a blower in the compartment formed by said pads and said partition adapted to draw air through said pads and discharge it into the passenger compartment of said automobile; a motor adapted to drive said blower; a reservoir connected to the lower parts of said pads and adapted to contain a liquid; and a means for delivering said liquid from said reservoir to said pads.

3. An air conditioner for automobiles which includes: a housing having an upper compartment; an evaporative pad in each end of said upper compartment but spaced from the end walls of said housing; a horizontal partition disposed above said pads forming with the top of said housing a horizontal duct connecting the spaces between said pads and their respective end walls; means for connecting said duct to the ventilator of said automobile; a blower in the compartment formed by said pads and said partition adapted to draw air through said pads and discharge it into the passenger compartment of said automobile; a motor adapted to drive said blower, said motor being positioned within said blower so as to be cooled by air circulating therethrough; a reservoir connected to the lower parts of said pads and adapted to contain a liquid; and a means for delivering said liquid from said reservoir to said pads.

4. An air conditioner for vehicles having a ventilator, comprising a housing having a partition therein dividing said housing into an upper compartment and a lower liquid reservoir, said upper compartment enclosing a pair of evaporative pads spaced from the inner walls thereof, conduit means connecting said housing with the ventilator of said vehicle, said conduit means being bifurcated to divide an air stream entering said ventilator and to convey a portion of the air to each space between an evaporative pad and the adjacent wall of said upper compartment, a blower within said upper compartment intermediate said evaporative pads arranged to draw air through said evaporative pads and to discharge such air into the interior of the vehicle, a motor for driving said blower, and means for elevating liquid from said liquid reservoir to said evaporative pads.

5. An air conditioner for vehicles having a ventilator, comprising a housing having a partition therein dividing said housing into an upper compartment and a lower liquid reservoir, said upper compartment enclosing a pair of evaporative pads spaced from the inner walls thereof, a bifurcated passageway connecting the ventilator of the vehicle with each space between an evaporative pad and the adjacent wall of said upper compartment, a blower within said upper compartment intermediate said evaporative pads arranged to draw air through said evaporative pads and to discharge such air into the interior of the vehicle, a motor for driving said blower, and means for elevating liquid from said liquid reservoir to said evaporative pads.

WILLIAM TAYLOR MUNFORD.